(12) United States Patent
Bielen et al.

(10) Patent No.: US 11,739,769 B2
(45) Date of Patent: Aug. 29, 2023

(54) SERVO VALVE FLAPPER AND NOZZLE STRUCTURE (71) Applicant: Hamilton Sundstrand Corporation, Charlotte, NC (US)

(72) Inventors: Michal Bielen, Sycow (PL); Marcin Cis, Wroclaw (PL); Lukasz Teuerle, Namyslow (PL); Bartosz Chabko, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/543,923

(22) Filed: Dec. 7, 2021

(65) Prior Publication Data
US 2022/0196040 A1  Jun. 23, 2022

(30) Foreign Application Priority Data

Dec. 22, 2020 (EP) .................................... 20461601

(51) Int. Cl.
| F15B 13/04 | (2006.01) |
| F16K 31/06 | (2006.01) |
| F15B 13/043 | (2006.01) |
| F16K 11/07 | (2006.01) |
| F16K 31/124 | (2006.01) |

(52) U.S. Cl.
CPC ...... *F15B 13/0433* (2013.01); *F15B 13/0435* (2013.01); *F16K 11/07* (2013.01); *F16K 31/0613* (2013.01); *F16K 31/0627* (2013.01); *F16K 31/0679* (2013.01); *F16K 31/0682* (2013.01); *F16K 31/124* (2013.01)

(58) Field of Classification Search
CPC .................................................. F15B 13/0438
See application file for complete search history.

(56) References Cited

U.S. PATENT DOCUMENTS

| 4,150,686 | A | 4/1979 | El Sherif et al. |
| 9,309,900 | B2 | 4/2016 | Kopp |
| 10,458,440 | B2 | 10/2019 | Sarafin et al. |
| 10,786,879 | B2 | 9/2020 | Sawicki |
| 2003/0173311 | A1 | 9/2003 | Younger et al. |
| 2009/0321667 | A1 | 12/2009 | Mccollum |
| 2015/0047729 | A1 | 2/2015 | Kopp et al. |
| 2020/0309284 | A1 | 10/2020 | Bujewicz |

FOREIGN PATENT DOCUMENTS

| FR | 2689598 A1 | 10/1993 |
| GB | 2104249 A | 3/1983 |

OTHER PUBLICATIONS

Translation of FR2689598 (Year: 2022).*
European Search Report for Application No. 20461601.5, dated May 21, 2021, 7 Pages.

* cited by examiner

*Primary Examiner* — Kelsey E Cary
(74) *Attorney, Agent, or Firm* — Cantor Colburn LLP (57) ABSTRACT

An integral flapper and nozzle structure for a servo valve assembly whereby the flapper, orifices and nozzles are formed by sheets of metal formed into a single component.

5 Claims, 7 Drawing Sheets

SERVO VALVE FLAPPER AND NOZZLE STRUCTURE

CROSS-REFERENCE TO RELATED APPLICATIONS

This application claims priority to European Patent Application No. 20461601.5 filed Dec. 22, 2020, the entire contents of which is incorporated herein by reference.

TECHNICAL FIELD

The present disclosure relates to servo valves used to transfer quantities of, or manage the flow of fluids, e.g., oil, fuel, or air, and, in particular, to a flapper and nozzle structure for a servo valve.

BACKGROUND

Servo valves find a wide range of applications for controlling air, fuel, oil or other fluid flows to effect driving or control of another part, e.g., an actuator or in fuel control systems.

A servo valve assembly may include a drive assembly such as a motor controlled by a control current which controls fluid flow to or from an actuator. Generally, a servo valve transforms an input control signal into movement of an actuator cylinder. The actuator controls another component which, in some examples, may be a valve. In other words, a servo valve acts as a controller, which commands the actuator, which changes the position of a valve's flow modulating feature.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic and hydraulic fluids to an actuator, e.g. to control moving parts such as flight control surfaces, flaps, landing gear, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve by controlling the flow of fluid acting on the spool. Movement of the spool causes alignment between the ports and fluid channels to be changed to define different flow paths for the control flow. Such systems are known in the art and will not be described here in detail.

Such conventional systems will be described in more detail below with reference to FIG. 1.

Conventional flapper-type systems are fairly large, bulky systems with a complex construction of several moving parts and channels, which means that there are several potential points of failure. The individual parts and orifices all need to be very precisely manufactured and then assembled into a valve assembly and calibrated to ensure proper and precise operation of the servo valve. The flapper is usually part of a torque motor, which is a separate sub-assembly and so this needs to be properly calibrated to the spool sub-assembly. Any slight imperfection in the geometry of any of the parts can result in faulty operation of the assembly. Such precise manufacturing and calibration is complex and time consuming. In addition, it is essential that no leakage occurs in the fluid circuit and so proper sealing needs to be ensured by use of seals, O-rings, brazing or the like.

There is a need for improved flapper-type servo valve arrangements that can handle large fluid flows effectively and at high operation frequency, but with fewer expensive and complex parts and which are simple to manufacture and assemble, whilst retaining a compact and reliable, responsive design and with the required precision.

SUMMARY

The present disclosure provides an integral flapper and nozzle structure for a servo valve whereby the flapper, orifices and nozzles are formed by sheets of metal formed into a single component.

The flapper is preferably formed in a first sheet of metal, the sheet being formed of a compliant metal, and the orifices are formed in a second sheet of metal, the first and second sheets being co-located such that the orifices are in a fixed spatial position relative to the flapper.

The structure may comprise a first sheet of flexible metal cut to define two opposing, flexible arm portions and provided, between the arm portions, with first and second opposing nozzles, first and second fixed orifices, a first channel between the first nozzle and the first orifice and a second channel between the second nozzle and the second orifice.

A first cover plate may be secured to a first face of the first sheet and a second cover plate may be secured to a second, opposite, face of the first sheet, one of the first and second cover plates provided with first and second output ports and a single supply port common to the first and second nozzles.

A slot may be provided through the structure to receive a drive member from a drive motor to move the flapper.

Also provided is a servo valve assembly comprising a spool body, a drive motor, a drive member extending from the drive motor to control movement of the spool body, and an integral flapper and nozzle structure as claimed in any preceding claim, whereby the integral flapper and nozzle structure is positioned such that movement of the drive member causes movement of the flapper relative to the nozzles to regulate fluid flow to the spool body to cause movement of the spool body.

Also provided is method of forming an integral flapper and nozzle structure as described above, the method comprising forming, by cutting, the flapper, nozzles and orifices in the sheets of metal such that the flapper is moveable relative to the nozzles.

BRIEF DESCRIPTION OF THE DRAWINGS

Preferred embodiments will now be described, by way of example only, with reference to the drawings.

DETAILED DESCRIPTION

Servo valves are generally used when accurate position control is required, such as, for example, control of a primary flight surface. Servo valves can be used to control pneumatic or hydraulic actuators or motors. They are common in industries which include, but are not limited to, automotive systems, aircraft and the space industry.

A known type of servo valve has a flapper and nozzle arrangement.

Figure 1:
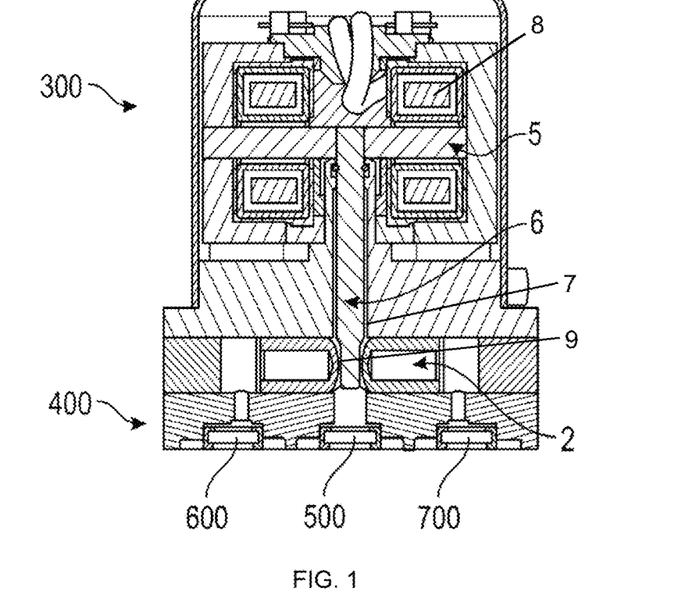
FIG. 1 is a sectional view of a conventional flapper type servo valve assembly.

FIG. 1 shows generally a known arrangement of a flapper and nozzle servo valve. The assembly comprises a torque motor subsystem 300 and a flapper-nozzle subsystem 400. In more detail, the assembly comprises a flapper 6 disposed in a flapper cavity 7, a pair of nozzles 9 disposed in a nozzle housing, and an electromagnet 8 surrounding an armature 5. The armature has opposed tips, which protrude through gaps in a housing surrounding the electromagnet, and which are arranged to leave spaces between the armature and the housing.

The electromagnet is connected to an electrical input (not shown) and the armature 5 is connected in a perpendicular manner to the flapper 6, or is an integral part of the flapper—the integral part being perpendicular to the flapper. The electromagnet includes coils that surround the armature and a set of permanent magnets that surround the coils. When a current is applied to the coils from the electrical input, magnetic flux acting on the ends of the armature is developed. The direction of the magnetic flux (force) depends on the sign (direction) of the current. The magnetic flux will cause the armature tips to be attracted to the electromagnet (current direction determines which magnetic pole is attracting and which one is repelling) thus varying the size of the spaces. This magnetic force creates an applied torque on the flapper, which is proportional to the applied current. The flapper rotates and interacts with the nozzles.

Nozzles 9 are housed within a respective nozzle cavity in the housing, and comprise a fluid outlet and fluid inlet. The housing also has a port, which allows communication of fluid to the nozzles. The flapper comprises a blocking element at an end thereof which interacts with fluid outlets of nozzles to provide metering of fluid from the fluid outlets to a fluid port in the housing. The fluid port in turn allows communication of fluid pressure downstream to a spool valve and actuator arrangement (not shown). The positioning of the flapper between nozzles (controlled by the movement of the armature via electromagnet) will control the amount of fluid pressure communicated to the spool valve and actuator arrangement (not shown), which can be used to control actuator movement.

Figure 2:
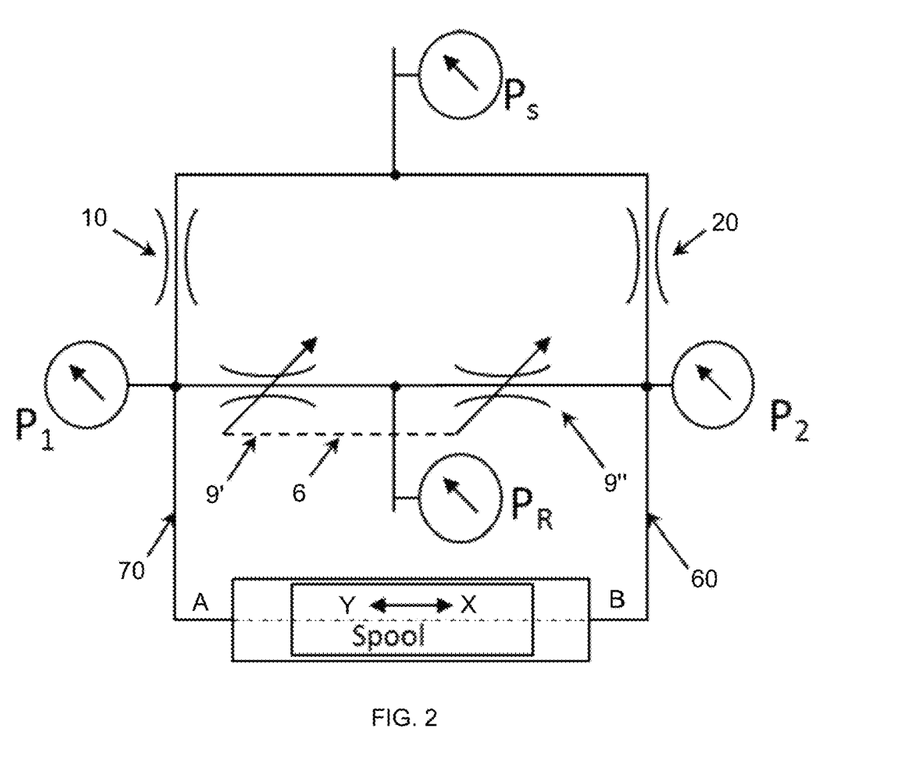
FIG. 2 is a simple schematic view to explain operation of a conventional flapper type servo valve assembly.

The flows of pressurised fluid in a conventional flapper type system can also be explained with reference to the simple schematic of FIG. 2. The hydraulic fluid to be regulated by the spool valve for moving the actuator is delivered from a fluid supply with a constant pressure Ps via orifices 10,20. At the orifices, the fluid is divided into two streams. One stream 6,7 is provided to the ends of the valve spool. The other stream is directed to the flapper nozzles 9', 9" where it is used to control movement of the spool due to the position of the flapper 6. Depending on the gap between the flapper and the respective nozzles 9', 9" more or less flow will be possible through each nozzle causing pressure differences in control channels P1 and P2 which results in pressures differences at the ends of the spool causing movement of the spool. Thus, if the flapper 6 is closer to nozzle 9' than nozzle 9", then more flow is possible through nozzle 9" and less through nozzle 9'. If less flow is possible through nozzle 9', more fluid flows to the end of the spool through channel 70 than through channel 60 thus increasing the pressure at end A of the spool compared to end B and thus causing the spool to move in direction X. Conversely, if the flapper is closer to nozzle 9", pressure increases at end B causing the spool to move in direction Y.

Although the flapper and nozzle type of servo valve arrangement shown in FIG. 1 can be effective at controlling an actuator, it has been found that limitations nevertheless exist. For example: in order to provide the correct limitations on flapper and armature movement, the spaces must be manufactured, assembled and calibrated very precisely to very tight tolerances, as must the spacing of the nozzles from the flapper. Moreover, there is also a general desire to reduce servo valve weight and simplify its manufacture, construction and operation, as well as improve the operational pressures and frequencies that may be realised with such servo valve arrangements.

The assembly of the present disclosure is an integral flapper and nozzle structure for a servo valve whereby the flapper, orifices and nozzles are formed by sheets of metal formed into a single component.

Figure 3A:
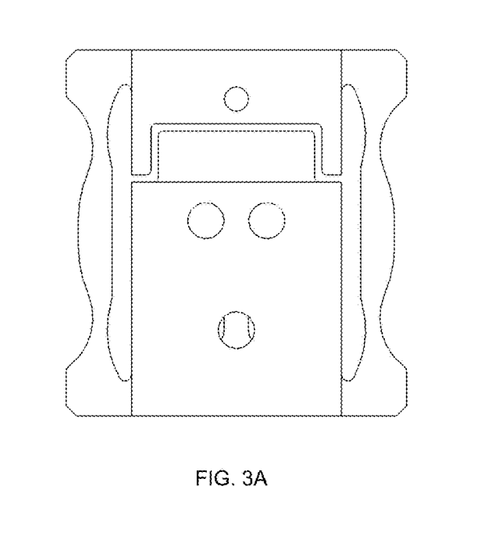
FIGS. 3A and 3B show two sides of a flapper structure for a servo valve according to the disclosure.
Figure 3B:
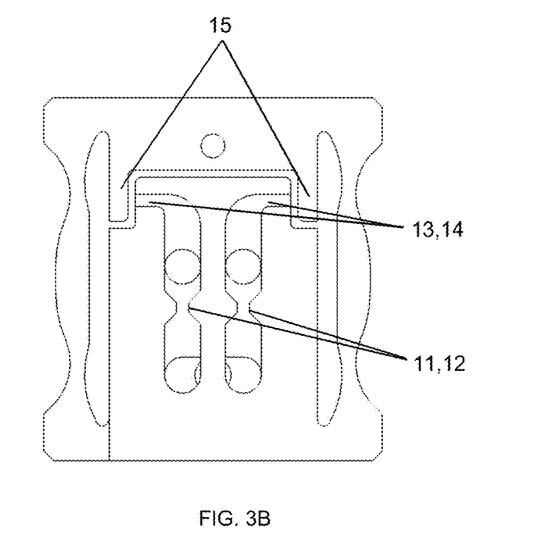

FIGS. 3A and 3B show, respectively, the two sides of the integral structure. The features of the flapper 15, nozzles 13,14 and orifices 11,12 are formed in a generally rectangular sheet metal structure. The orifices 11, 12 are formed in a first sheet and are designed to be fixed in position relative to the other sheet into which the flapper 15 is formed. The flapper 15 is formed in a sheet of compliant material such that its position or spacing relative to the nozzles 13,14 can be varied.

The manufacturing steps are explained with reference to FIGS. 4A to 4C.

Figure 4A:
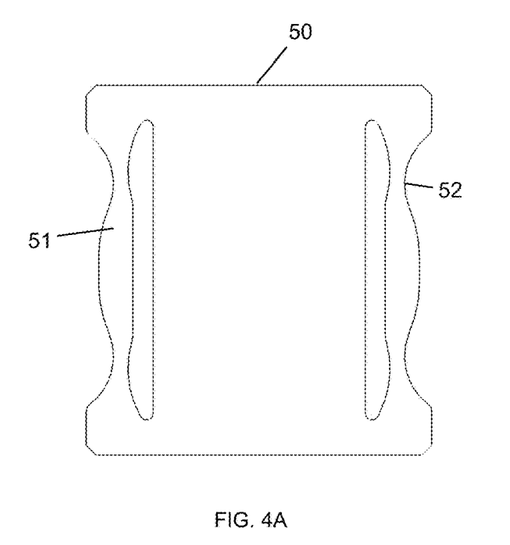
FIGS. 4A to 4C shows steps of manufacturing a structure according to the disclosure.
Figure 4B:
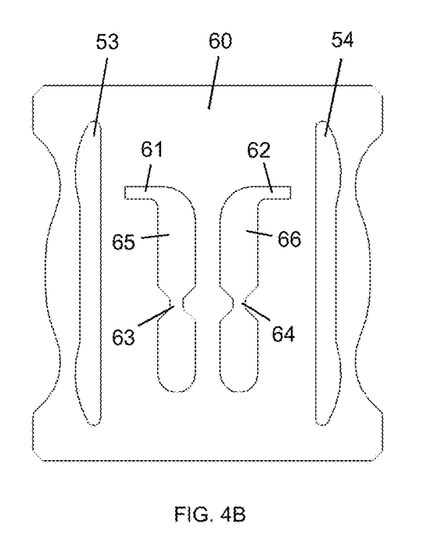
Figure 4C:
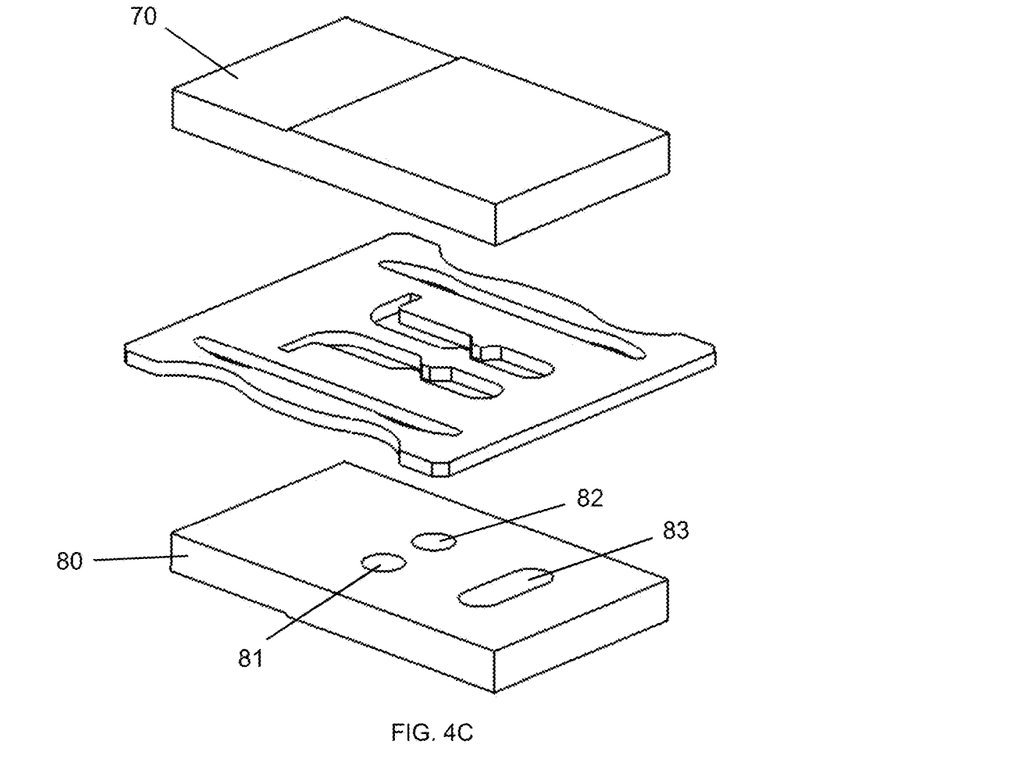

First, as shown in FIG. 4A a sheet 50 of flexible material of generally rectangular shape is cut to define two opposing arm portions 51, 52. The arms are elastic such that they can move within the plate structure as will be described further below.

In the area of the sheet 60 defined between the cuts 53, 53 that define the arm portions 51,52, shapes are cut to define two opposing nozzles 61,62 (13, 14 in FIG. 3B) and two constant orifices 63, 64 (11, 12 in FIG. 3B) and supply channels 65,66 between the orifices and the nozzles. The cutting has to be performed in a highly precise manner e.g. by laser cutting, water-jet cutting, wire-EDM cutting or photo-etching.

Figure 5:
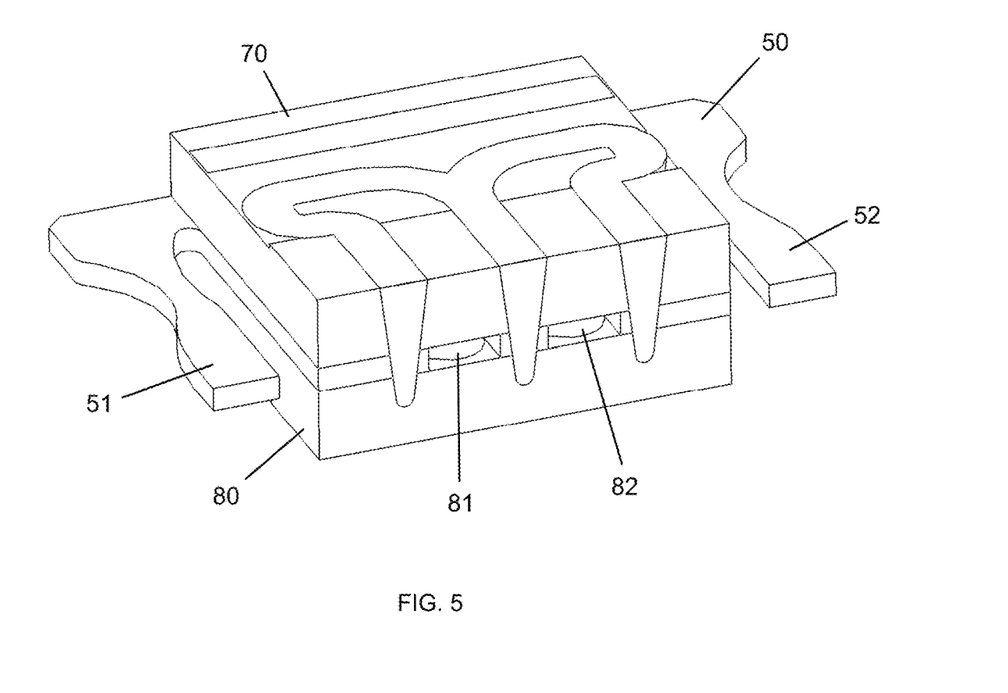
FIG. 5 is a perspective view of a section of the structure after the steps shown in FIGS. 4A to 4C.

Once this structure has been cut into the metal sheet 50 a cover plate 70,80 is fixed to either side of the sheet 50. One of the cover plates 80 is provided with two output ports 81,82 for piloting channels for the valve spool (not shown) and a single supply port 83 common to the two nozzles 61,62. This creates a sandwich structure shown in section in FIG. 5. The cover plates 70,80 can be fixed to the metal sheet 50 by any method that ensures strength and tightness of fixation e.g. by electron beam welding.

Figure 6A:
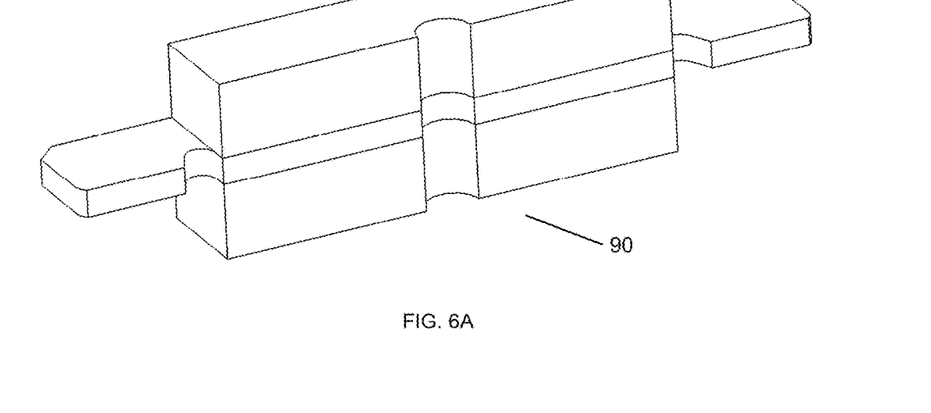
FIG. 6A is a section of the structure of FIG. 5 into which a slot is cut.

A slot 90 is then formed through the sandwich layers as shown in FIG. 6. This allows a drive member (not shown here) from a torque motor to engage with the flapper for moving the flapper in response to the servo valve control command. It is also possible to locate a feedback spring (not shown) in this slot to provide feedback from the valve spool to the flapper.

Figure 6B:
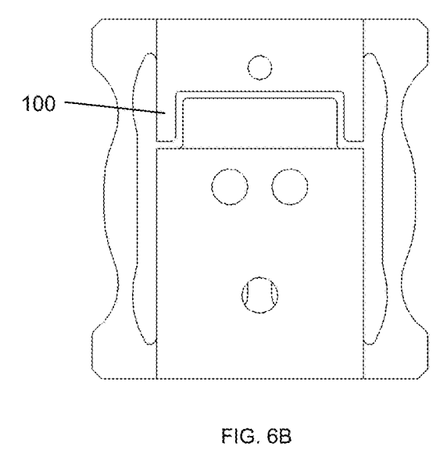
FIGS. 6B and 6C illustrate how the flapper is formed in the structure. . . .
Figure 6C:
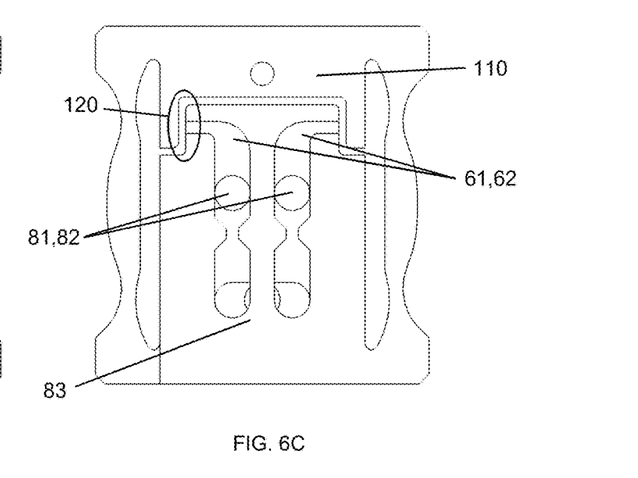

The next stage involves cutting through the sandwich structure, as shown in FIGS. 6B and 6C, along a cutting line 100 to define the flapper 110. The cut defining the flapper 110 is made such as to define a precisely calibrated gap 120 between the flapper 110 and the nozzles 61,62. It is critical that the position of the nozzles 61,62 with respect to the flapper 110 is precisely set at this stage. The gaps 120 between the flapper and the nozzles may be the same or different for each nozzle but must be precisely set.

This process results in an integral flapper and nozzle and orifice structure in the form of a single sandwich package as shown in e.g. FIGS. 3A and 3B.

Figure 7A:
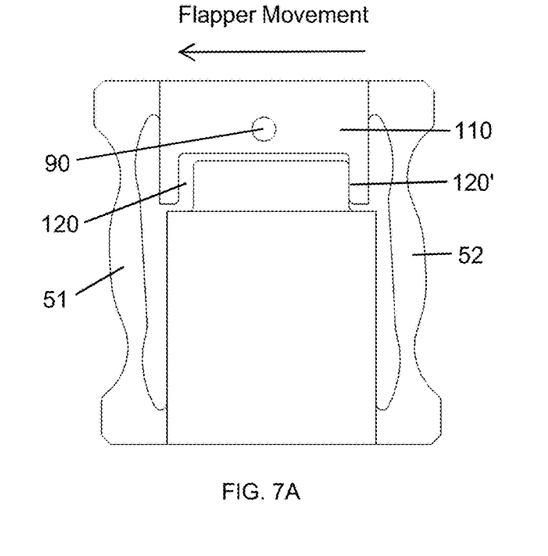
FIGS. 7A and 7B illustrate operation of the structure of the disclosure.
Figure 7B:
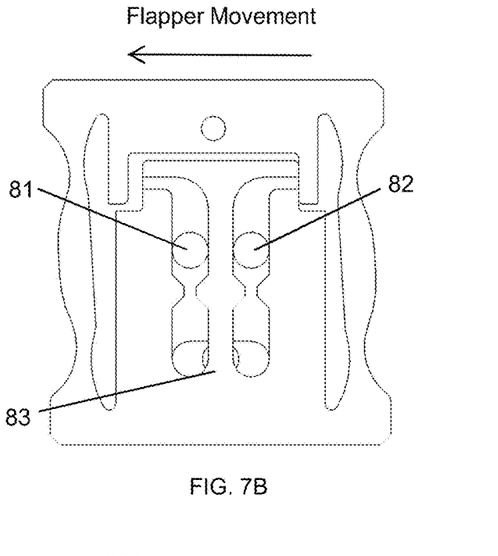

Operation of the flapper and nozzle structure can be described with respect to FIGS. 7A and 7B.

In response to a command, e.g. sent to a torque motor or other drive assembly, a drive member (not shown) is moved. The drive member is engaged with the flapper 110 e.g. by extending through the slot 90. This causes the flapper 110 to move (shown by the arrow) with respect to the rest of the structure containing the nozzles. This movement is enabled by the elasticity of the arms 51,52. The elasticity also biases the flapper 110 to return to the original position when the force of the drive member is removed.

As can be seen, as the flapper 110 moves, the gaps between the flapper and the respective nozzles 61,62 change. In the example shown, as the flapper 110 moves in the direction of the arrow, the gap 120 between the flapper and the nozzle 61 (13 in FIG. 3B) increases, while the gap 120' between the flapper and the other nozzle 61 decreases.

When assembled into a servo valve assembly, the flapper 110 operates to vary flow between the respective nozzles resulting in a pressure differential that causes movement of the valve spool as previously described for conventional systems.

Figure 8:
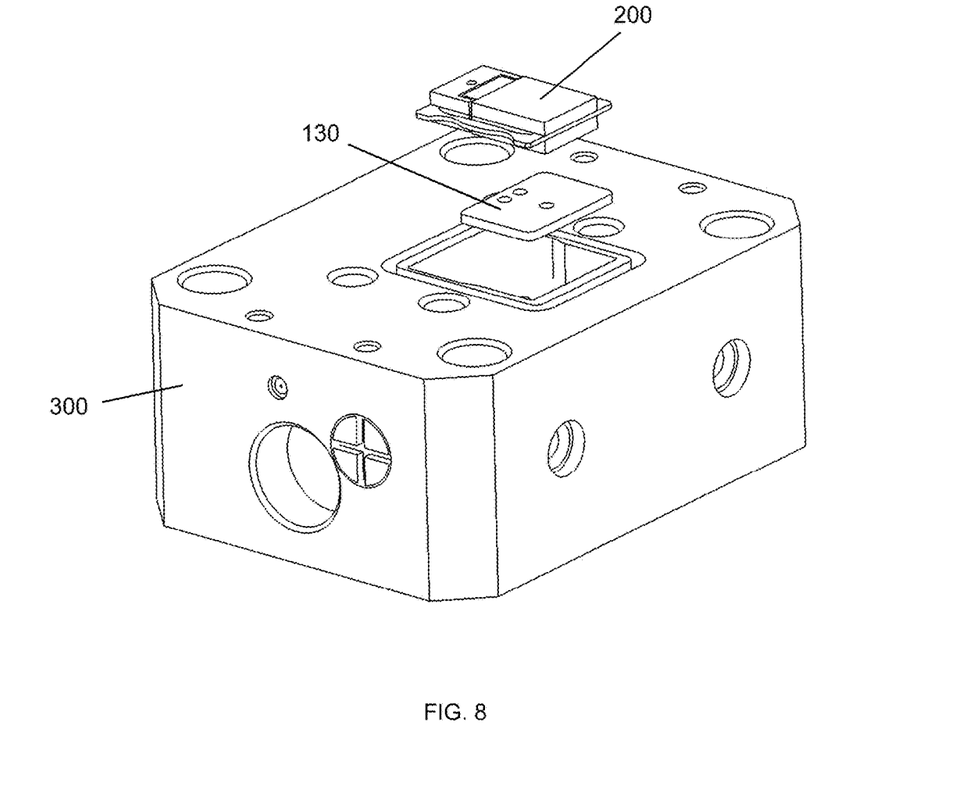
FIG. 8 is a perspective view illustrating assembly of the structure into a servo valve assembly.
Figure 9:
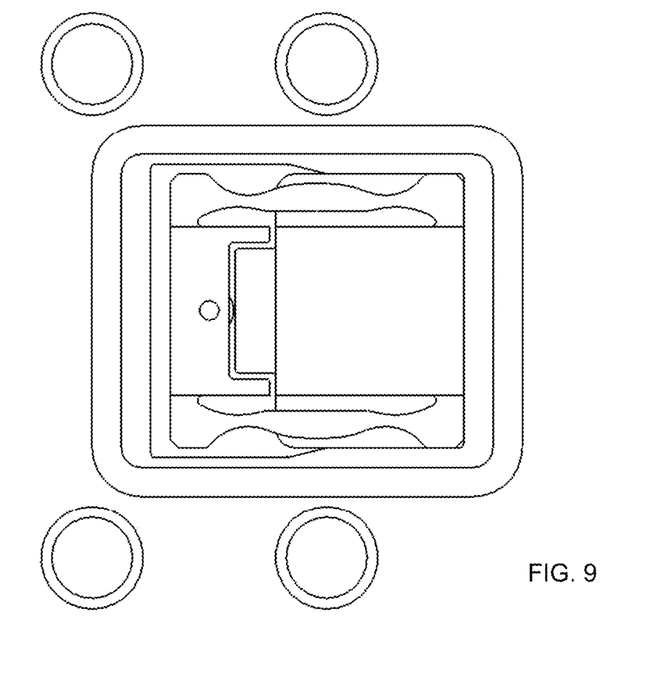
FIG. 9 is atop view of the servo valve assembly of FIG. 8 with the flapper structure inserted therein.

FIGS. 8 and 9 show how the flapper and nozzle structure 200 can be assembled into the body of a servo-valve assembly between the motor (not shown) and the valve body 300. A gasket 130 may be positioned as a seal between the flapper structure and the valve body.

Figure 10:
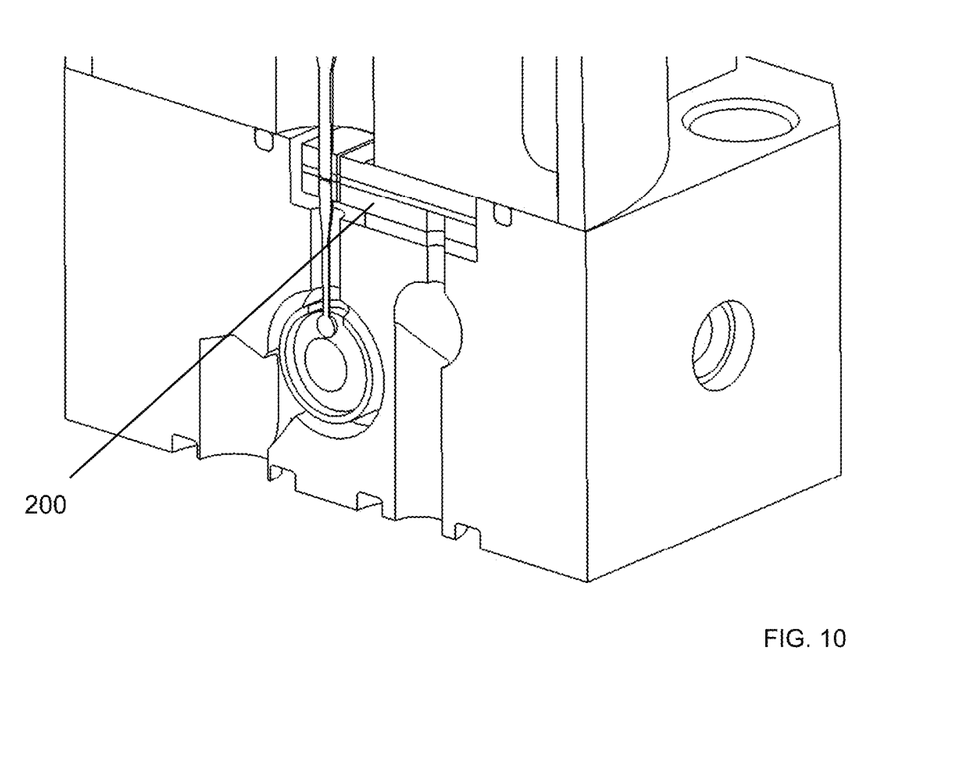
FIG. 10 is a detail section view of a servo valve assembly having a flapper structure according to the disclosure.
Figure 11:
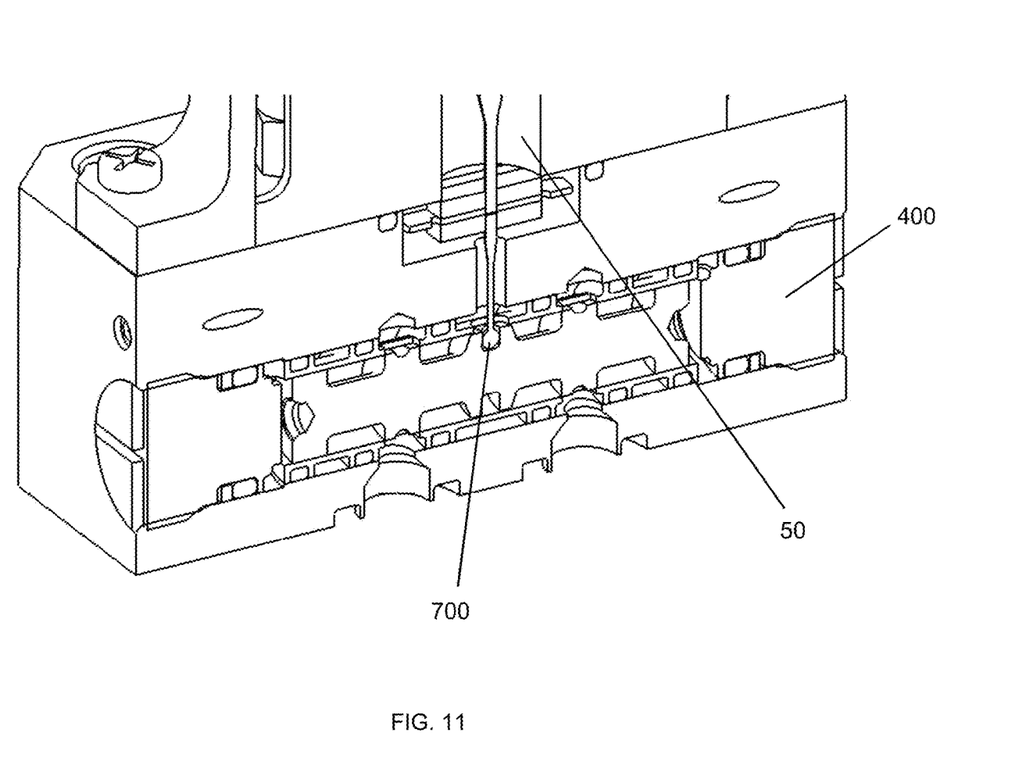
FIG. 11 is an alternative sectional view of the assembly of FIG. 10.

FIGS. 10 and 11 show the flapper and nozzle structure 200 fitted into a servo valve assembly to cause movement of the valve spool 400. The drive member 500 can be seen extending from the drive sub-assembly where the motor would be located. This extends through the slot 90 in the flapper and nozzle structure 200 and is drive in response to a control command to move the flapper 110 as described above with reference to FIGS. 7A and 7B. A spring or feedback wire 700 may also extend through the slot to provide feedback from the valve spool 400.

Movement of the flapper with respect to the nozzles, as described above, varies the gap between the flapper and the nozzles and, hence, the fluid flow through the nozzles, which, in turn gives rise to a pressure differential in the channels feeding the respective ends of the spool 400, this causing axial movement of the spool.

Compared to known flapper and nozzle designs whereby the various parts are formed separately and then assembled and calibrated, the single package structure of this disclosure, integrating the nozzles and orifices and flapper, means that the critical components of the servo valve control structure can all be made precisely and with repeatable accuracy as a single structure. This can then be easily replaced in the valve even during service.

In addition, no additional assembly and sealing is required to mount the flapper relative to the nozzles and relative to the orifices and so additional sealing to prevent leakage is not required.

The structure is simple and cost effective to manufacture and assemble into the valve body. The structure can also be easily designed for different performance requirements merely by making different size cuts during manufacture.

The invention claimed is:

1. An integral flapper and nozzle structure for a servo valve, the structure comprising:
   sheets of metal that include the flapper, orifices and nozzles;
   wherein the sheets of metal are formed into a single component;
   wherein the flapper is formed in a first sheet of metal, the sheet being formed of a compliant metal, and the orifices are formed in a second sheet of metal, the first and second sheets being co-located such that the orifices are in a fixed spatial position relative to the flapper;
   wherein the second sheet of flexible metal is cut to define two opposing, flexible arm portions and provided, between the arm portions, with first and second opposing nozzles, first and second fixed orifices, a first channel between the first nozzle and the first orifice and a second channel between the second nozzle and the second orifice.

2. The structure of claim 1, wherein the sheets of metal include:
   a first cover plate secured to a first face of the first sheet and a second cover plate secured to a second, opposite, face of the first sheet, one of the first and second cover plates provided with first and second output ports and a single supply port common to the first and second nozzles.

3. The structure of claim 1, further comprising a slot formed through the sheets of metal arranged to receive a drive member from a drive motor to move the flapper.

4. A servo valve assembly comprising:
   a spool body;
   a drive motor;
   a drive member extending from the drive motor to control movement of the spool body; and
   an integral flapper and nozzle structure as claimed in claim 1, whereby the integral flapper and nozzle structure is positioned such that movement of the drive member causes movement of the flapper relative to the nozzles to regulate fluid flow to the spool body to cause movement of the spool body.

5. The structure of claim 1, wherein the sheets of metal define a rectangular sheet metal structure such that the flapper formed in the first sheet is arranged over the second sheet so that the flapper is moveable the arm portions of the second sheet to allow the flapper move relative to first and second opposing nozzles.

* * * * *